United States Patent [19]

Tomforde et al.

[11] Patent Number: 4,473,252
[45] Date of Patent: Sep. 25, 1984

[54] MOTOR VEHICLE

[75] Inventors: Johann Tomforde, Sindelfingen; Peter Pfeiffer, Böblingen; Harald Leschke, Sindelfingen, all of Fed. Rep. of Germany

[73] Assignee: Daimler-Benz Aktiengesellschaft, Fed. Rep. of Germany

[21] Appl. No.: 330,777

[22] Filed: Dec. 14, 1981

[30] Foreign Application Priority Data

Dec. 12, 1980 [DE] Fed. Rep. of Germany ....... 3046825

[51] Int. Cl.$^3$ .............................................. B60J 5/00
[52] U.S. Cl. ..................................... 296/146; 49/502; 296/84 E; 296/200
[58] Field of Search ............. 296/146, 200, 201, 84 E; 49/502, 374

[56] References Cited

U.S. PATENT DOCUMENTS

| 2,405,394 | 8/1946 | Austin | 296/201 |
| 2,896,997 | 7/1959 | Garcia | 296/200 |
| 3,622,197 | 11/1971 | Vogelei | 296/146 |
| 3,803,762 | 4/1974 | Abeel | 49/502 |
| 4,017,117 | 4/1977 | Eggert | 296/146 |
| 4,034,509 | 7/1977 | DeRees | 49/374 |

Primary Examiner—Bruce H. Stoner, Jr.
Assistant Examiner—John A. Carroll
Attorney, Agent, or Firm—Craig & Burns

[57] ABSTRACT

A passenger motor vehicle provided with side windows and a convergent roof having a width narrower than a distance between side walls of the vehicle. Each of the side windows includes a first area disposed adjacent to the roof and corner posts, with the first area being inclined relative to other areas of the window. The first window areas are sharply sloped or inclined toward the roof and corner posts with the other areas of the side windows being at most slightly inclined or sloped inward towards the vertical.

12 Claims, 2 Drawing Figures

MOTOR VEHICLE

BACKGROUND OF THE INVENTION

The present invention relates to a motor vehicle and, more particularly, to a passenger motor vehicle provided with side windows and a convergent roof having a width which is substantially narrower than side wall areas of the motor vehicle.

There are numerous very rigorous requirements in passenger motor vehicle construction with regard to, for example, high mileage, aerodynamically favorable design, as well as high internal safety despite the fact that the construction is to be of a weight which is reduced to an absolute minimum.

The aim underlying the present invention essentially resides in providing a passenger motor vehicle of te aforementioned type which meets the numerous requirements to a large extent without the disadvantages caused by increased construction costs.

SUMMARY AND OBJECTS OF THE INVENTION

In accordance with advantageous features of the present invention. in a passenger motor vehicle, areas of side windows adjacent to the roof and corner posts are bent or curved with respect to other areas and slope sharply toward the roof and corner posts while other central areas of the side windows are at most slightly sloped inward toward the vertical longitudinal plane of the vehicle.

In accordance with further features of the present invention, at least one of the side windows of the central area is constructed so as to be selectively raised and lowered.

In constructions where it is not necessary to provide for a side window which has the capabilities of being raised and lowered, it is possible for the side window to be contructed as a single piece.

In order to obtain particularly favorable air flow, in accordance with further advantageous features of the present invention, outer edges of the areas are constructed so as to be flush with portions of the body of the vehicle adjacent to such areas.

One advantage of the above noted features of the present invention resides in the fact that there are a number of ways to reinforce or strengthen the lower door or side wall area by the provision of, for example, small side windows which may be selectively raised and lowered, with the side windows being of a sufficient size so as to enable, for example, the handing over of passports, tolls, or the like. By the provision of small side windows, it is also possible then to utilize a simple and compact window raising and lowering construction.

A further advantage of the present invention resides in the fact that in the vehicle cross section the so-called side drop may more readily be adapted to the body contour of the vehicle occupants thereby allowing a greater shoulder width and smaller vehicle width with the same passenger compartment width.

Yet another advantage of the motor vehicle construction of the present invention resides in the fact that it is possible to achieve an optimum aerodynamic behavior due to a particularly favorable layout contour of the roof structure, which structure has a roof width which is convergent relative to the side walls of the vehicle. This construction enables the avoiding of turbulent zones in areas of the vehicle posts and roof frame due to the fact that outer areas of the side windows are constructed so as to be flush with a shell of the motor vehicle. This means that, for example, even with front side windows being open, it is possible to drive almost without any pull or drag on the motor vehicle.

Accordingly, it is an object of the present invention to provide a motor vehicle construction which avoids, by simple means, shortcomings and disadvantages encountered in the prior art.

Another object of the present invention resides in providing a motor vehicle having an aerodynamically favorable construction which is of relatively light weight.

A still further object of the present invention resides in providing a motor vehicle which is simple in construction and therefore relatively inexpensive to manufacture.

These and other objects, features, and advantages of the present invention will become more apparent from the following description when taken in connection with the accompanying drawings which show, for the purpose of illustration only, one embodiment in accordance with the present invention, and wherein:

DESCRIPTION OF THE PREFERRED EMBODIMENT

Figure 1:
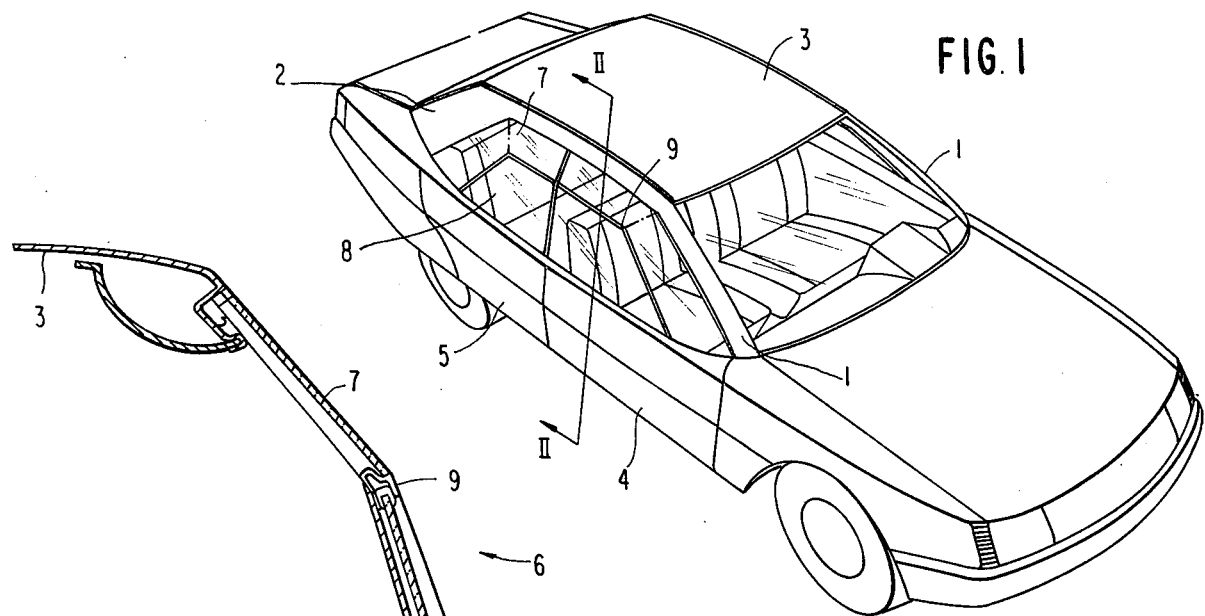
FIG. 1 is a perspective view of a passenger motor vehicle constructed in accordance with the present invention.

Referring now to the drawing wherein like reference numerals are used in both views to designate like parts and, more particularly, to FIG. 1, wherein a motor vehicle such as, for example, a passenger motor vehicle includes a roof 3 is supported by corner posts 1, 2, with the vehicle being provided with side doors 4, 5. The corner posts 1, 2 converge toward the center of the vehicle and relative to a vertical longitudinal plane of the vehicle with the outer surfaces of the door converging toward the roof so as to produce particularly favorable aerodynamic conditions.

Figure 2:
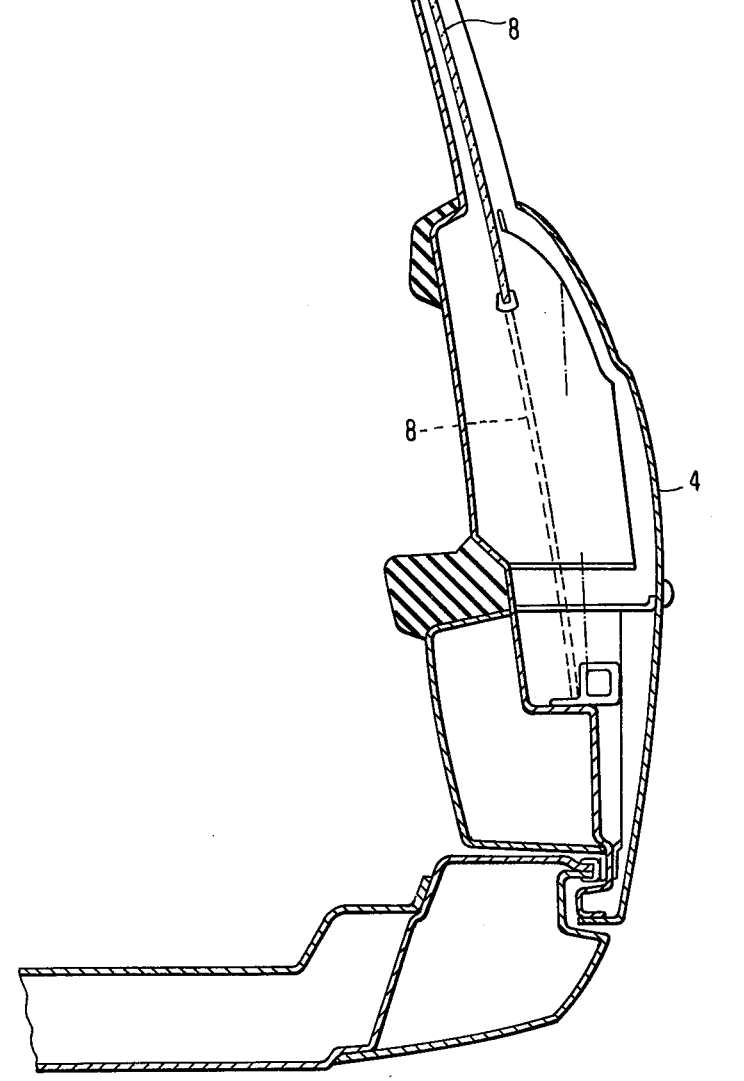
FIG. 2 is a cross sectional view, on an enlarged scale, taken along the line II—II in FIG. 1.

As shown most clearly in FIG. 2, side windows, generally designated by the reference numeral 6, are provided in each of the doors 4, 5, with the side windows 6 including an area 7 adjacent to the roof 3 and corner posts 1 or 2. The window area 7 of the side window 6 associated with each respective door 4, 5 is constructed so as to be fixed relative to the roof 3 when the doors 4, 5 are secured in their closed position. Each side window 6 includes a central window area 8 associated with a respective door 4, 5 which is constructed so as to be selectively raised and lowered by a suitable conventional mechanism not shown. A frame 9 is interposed between the upper window area 7 and the central area 8 of each of the side windows 6.

As shown in FIG. 2, the fixed areas 7 of the side windows 6 are sloped relatively sharply toward the corner posts 1, 2 and/or the roof 3 in a direction toward the center of the vehicle, with outer edge areas of the window area 7 being flush with areas of the adjacent roof 3 and corner post 1, 2. The window areas 8 of the side windows 6 which are adapted to be lowered are sloped or inclined only relatively slightly toward or with respect to the vertical longitudinal plane of the vehicle.

While we have shown and described one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A motor vehicle including spaced side doors, having windows therein, defining portions of opposite outer side surfaces of the vehicle, a roof having a width narrower than a space between the side doors, a plurality of spaced corner post means for supporting the roof, each side door including a first window area and a second window area, the first window area in each door being arranged so as to be adjacent to one of the plurality of spaced corner post means and the roof when the respective door is in a closed position, the second window area of each door being shiftable relative to the first window area and arranged so as to be slightly inwardly inclined with respect to a vertical longitudinal plane of the vehicle, the first window area being inclined relatively sharply from the second window area toward the plane and in a direction toward the roof and corner post means.

2. A motor vehicle according to claim 1, including means for mounting the second window area so as to enable the second window area to be selectively raised and lowered, said first window means being constructed to be fixed relative to the roof and corner post means when the respective door is secured in a closed condition.

3. A motor vehicle according to one of claims 1 or 2, wherein outer edge areas of the respective first window areas are disposed so as to be flush with adjacent roof and corner post means when the respective door is closed.

4. A motor vehicle according to claim 1, including frame means between said first window area and said second window area of each respective door.

5. A motor vehicle according to claim 2, including frame means between said first window area and said second window area of each respective door.

6. A motor vehicle according to claim 2, wherein said roof has two front and two rear corners and wherein said plurality of corner post means includes a post at each corner of the roof, each said corner post converging with each of the other corner posts toward the center of the vehicle.

7. A motor vehicle according to claim 6, wherein outer edge areas of the respective first window areas are constructed so as to be substantially flush with an adjacent area of the roof and a respective corner post when the respective door is secured in a closed position thereby exhibiting an aerodynamic profile which inhibits the formation of turbulent zones in areas where the side windows meet the roof and corner post means.

8. A motor vehicle including spaced side doors defining portions of opposite outer side surfaces of the vehicle, a roof having a width narrower than a space between the side doors, a plurality of spaced corner post means for supporting the roof, and a plurality of window areas in each of the side doors, each side door including a fixed first window area, a second window area constructed to be selectively raised and lowered and frame means interposed between the first and second window areas, the first window area in each door being arranged so as to be adjacent to one of the plurality of spaced corner post means and the roof when the respective door is in a closed position, the second window area of each door being arranged so as to be slightly inwardly inclined with respect to a vertical longitudinal plane of the vehicle and the first window area being inclined relatively sharply from the second window area toward the plane and in a direction toward the roof and corner post means.

9. A motor vehicle according to claim 8, including means for mounting the second window area so as to enable the second window area to be selectively raised and lowered, said first window means being constructed to be fixed relative to the roof and corner post means when the respective door is secured in a closed condition.

10. A motor vehicle according to claim 8, wherein outer edge areas of the respective first window areas are disposed so as to be flush with adjacent roof and corner post means when the respective door is closed.

11. A motor vehicle according to claim 9, wherein said roof has two front and two rear corners and wherein said plurality of corner post means includes a post at each corner of the roof, each said corner post converging with each of the other corner posts toward the center of the vehicle.

12. A motor vehicle according to claim 11, wherein outer edge areas of the respective first window areas are constructed so as to be substantially flush with an adjacent area of the roof and a respective corner post when the respective door is secured in a closed position thereby exhibiting an aerodynamic profile which inhibits the formation of turbulent zones in areas where the side windows meet the roof and corner post means.

* * * * *